July 28, 1964 M. A. CHAVANNES 3,142,599
METHOD FOR MAKING LAMINATED CUSHIONING MATERIAL
Filed Nov. 27, 1959 3 Sheets-Sheet 1
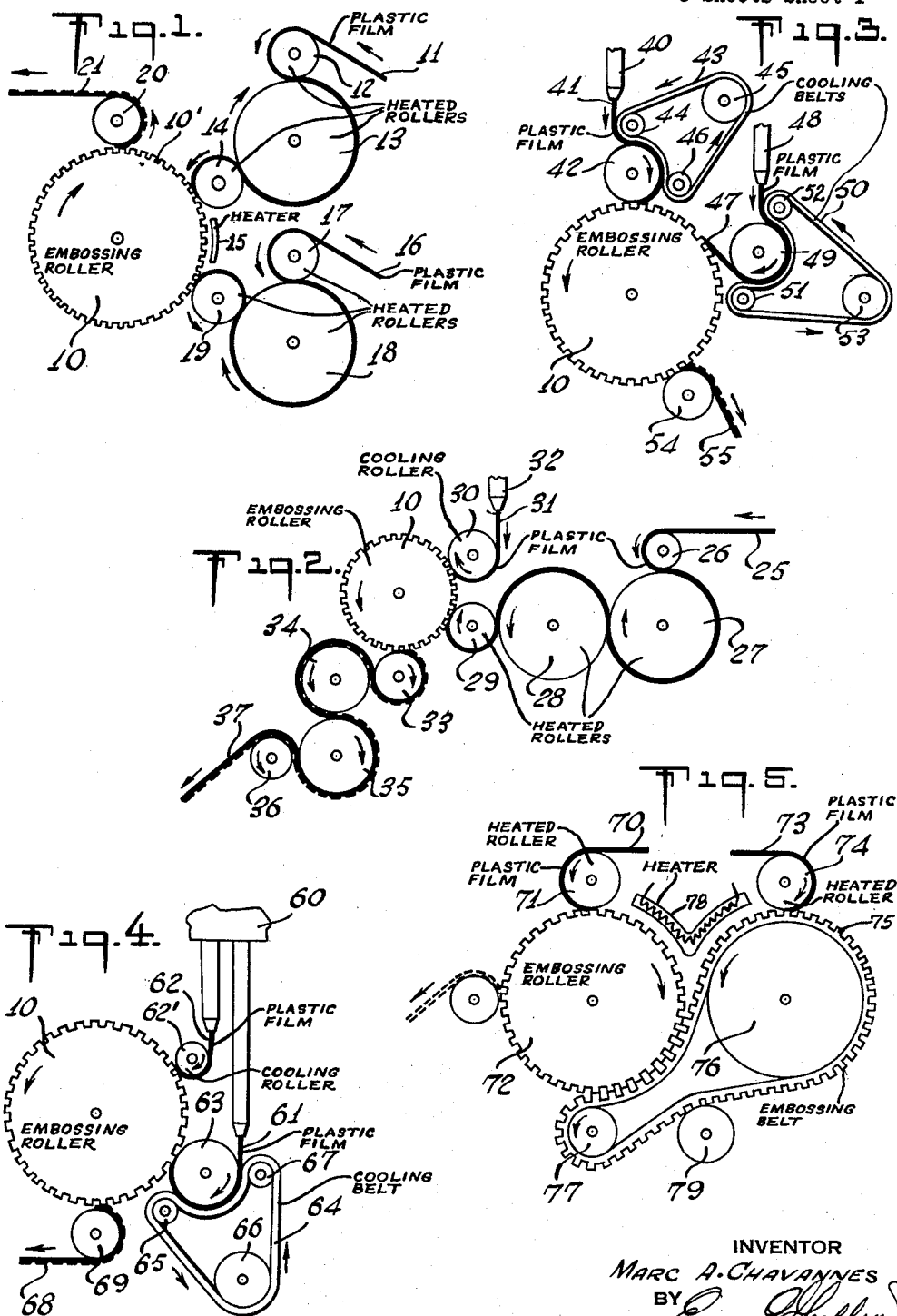
INVENTOR
MARC A. CHAVANNES
BY
ATTORNEY July 28, 1964  M. A. CHAVANNES  3,142,599
METHOD FOR MAKING LAMINATED CUSHIONING MATERIAL
Filed Nov. 27, 1959  3 Sheets-Sheet 2
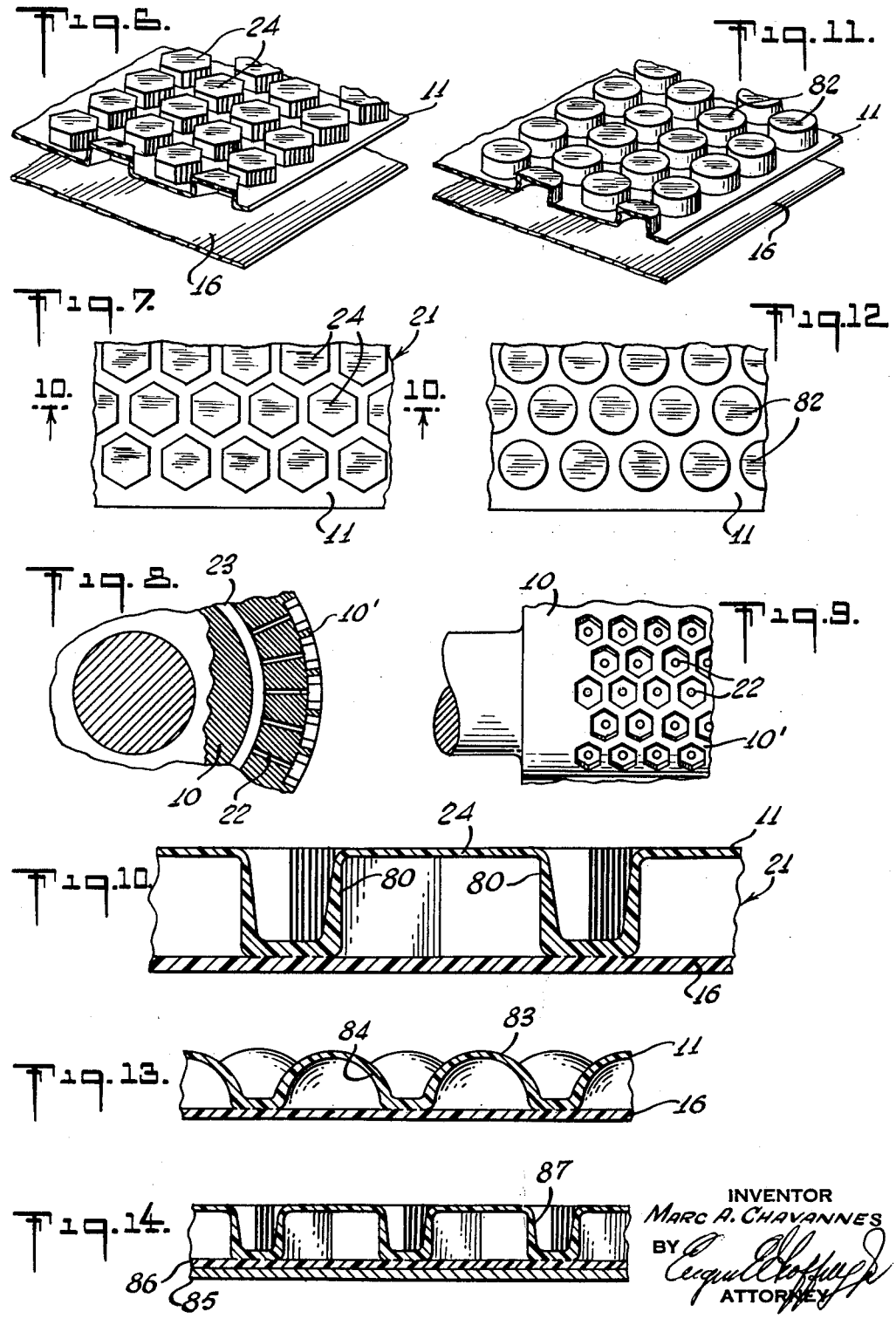
INVENTOR
MARC A. CHAVANNES
BY
ATTORNEY July 28, 1964 M. A. CHAVANNES 3,142,599
METHOD FOR MAKING LAMINATED CUSHIONING MATERIAL
Filed Nov. 27, 1959 3 Sheets-Sheet 3
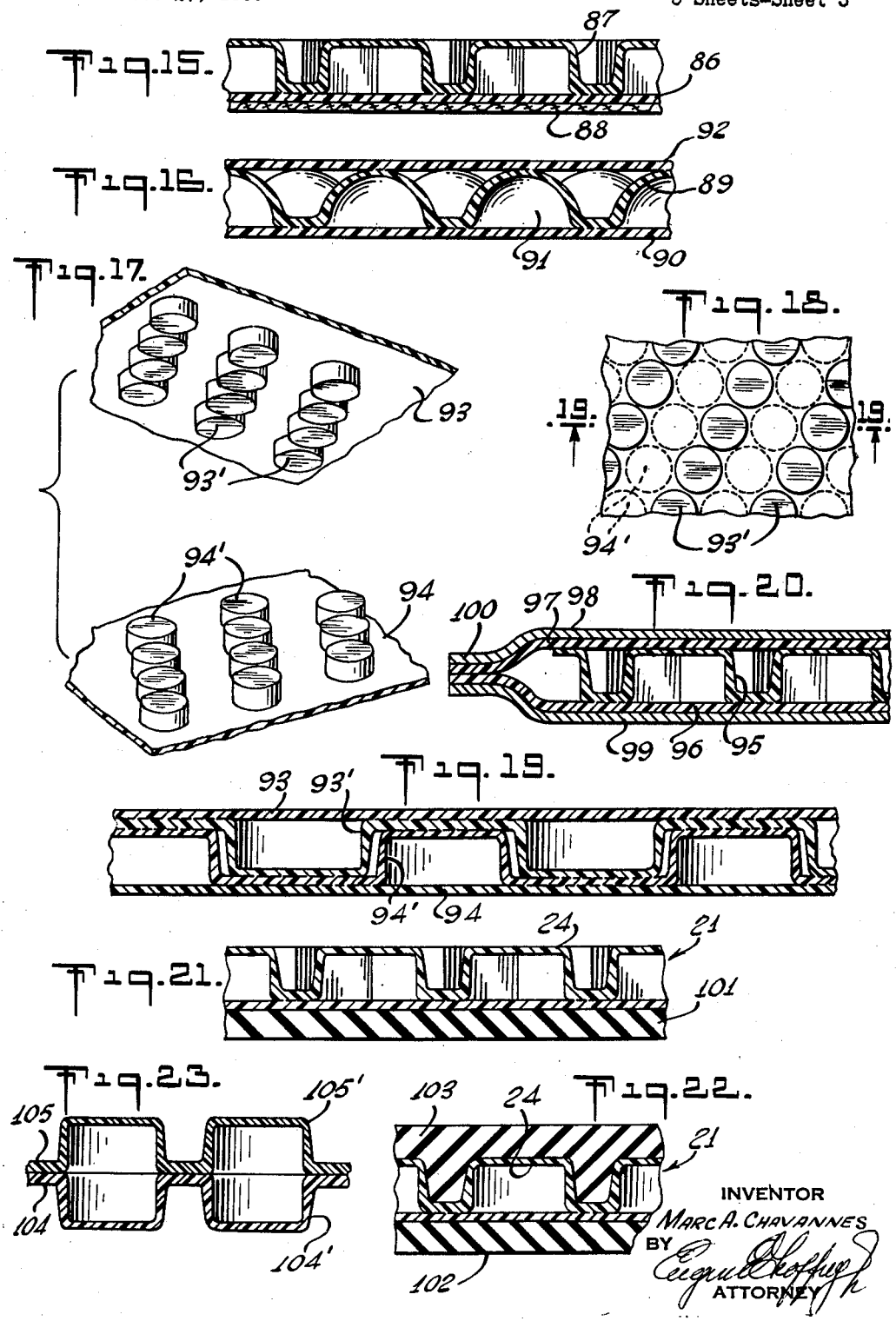

United States Patent Office 3,142,599
Patented July 28, 1964

3,142,599
METHOD FOR MAKING LAMINATED
CUSHIONING MATERIAL
Marc A. Chavannes, Brooklyn, N.Y., assignor to Sealed
Air Corporation, Hawthorne, N.J.
Filed Nov. 27, 1959, Ser. No. 855,712
5 Claims. (Cl. 156—210)

This invention relates to laminated materials and their manufacture. The invention more specifically concerns a new and improved method and apparatus for the lamination of plastic and other similar sheet materials and the resulting laminated structures which are useful, among other things, for cushioning and shock absorbing applications as, for example, packaging of products, padding of furniture, cars and trucks, heat insulation and the like.

Plastic sheet or film, and particularly thermoplastic film is utilized in industry for many purposes and heat sealing techniques have been utilized for securing sections of film one to the other as in the formation of raincoats and the like. The lamination of plastics, however, has presented a serious problem and the use of adhesives are generally relied upon in the attainment of that end. It has been found that while adhesives are satisfactory for many purposes, they often fail to provide a uniform and dependable bond and obviously result in a structure wherein the laminated elements maintain their identity as individual layers. Furthermore, the introduction of an adhesive is objectionable because of costly drying operations and the introduction of foreign material with different characteristics.

This invention has as one of its objectives the provision of an improved method and apparatus which overcome the disadvantages of known laminating procedures and provide an improved product wherein the laminated sheets or films are fused to form a substantially unitary sheet with a permanent hermetic bond between the laminae. This end is attained through an improved process which does not employ adhesives and yet will permit lamination at exceedingly high speeds.

Another aspect of the invention resides in an improved method and apparatus for the fabrication of an improved laminated cushioning material wherein at least one lamina or layer is formed to provide a plurality of discrete elements and then a second layer is hermetically sealed to the formed layer to seal the elements and thereby provide sealed pockets in which air or other fluid is entrapped. Since the laminated layers of material have flexibility and elasticity, the resultant laminated material affords a high degree of cushioning as well as shock absorbing action. In the fabrication of such cushioning material, the pneumatic cushioning may be supplemented by an improved mechanical cushioning effected by the design and configuration of the formed elements.

The improved procedure for fusion sealing layers of plastic materials affords a further advantage in that powdered materials, such as fire retarding agents and desiccants or moisture absorbers, may be incorporated between the layers without affecting the seal therebetween.

A still further advantage of the invention resides in the provision of improved cushioning products wherein the pneumatic cushioning or shock absorbing structure is coordinated with other cushioning materials such as natural and synthetic rubbers as well as other sheet materials to obtain modified cushioning characteristics, increased strength and the like.

The cushioning material in accordance with the invention affords cushioning and shock absorbing action not obtainable by known materials within comparable size and weight limitations and at the same time the cost of this improved cushioning material is far below the cost of other known materials affording equivalent characteristics.

The above and other objects and advantages of the invention will become more apparent from the following description and accompanying drawings forming part of this application.

In the drawings:

FIG. 1 is a diagrammatic view of one embodiment of apparatus in accordance with the invention utilizing plastic sheet material in the fabrication of the cushioning structure in accordance with the invention;

FIG. 2 is a diagrammatic view of a modified embodiment of the invention utilizing a preformed film together with means for directly extruding a second film for lamination to the first said film;

FIGS. 3 and 4 are diagrammatic views of still additional embodiments of the invention wherein two films are processed immediately upon emergence from extrusion apparatus;

FIG. 5 is a still further modification of the invention in diagrammatic form and illustrates the lamination of two molded films;

FIG. 6 is an exploded perspective view of one form of a molded and laminated product in accordance with the invention;

FIG. 7 is a plan view of the structure shown in FIG. 6;

FIG. 8 is a diagrammatic fragmentary view of one form of a molding roller that may be utilized in connection with the apparatus shown in FIGS. 1 through 5 for the production of a molded film as illustrated in FIGS. 6 and 7;

FIG. 9 is a side elevation of the roller as illustrated in FIG. 8;

FIG. 10 is a cross sectional view of the material shown in FIG. 7 and taken along the line 10—10 thereof;

FIG. 11 is an exploded perspective view showing a modified embodiment of the invention;

FIG. 12 is a plan view of the modified cushioning structure shown in FIG. 11;

FIG. 13 is a cross sectional view of still another form of the invention utilizing hemispherical embossments;

FIGS. 14 and 15 illustrate further embodiments of the invention wherein materials such as paper and fabric are adhered to the cushioning product in accordance with the invention;

FIG. 16 illustrates still another embodiment of the invention wherein the sealed embossments are retained between parallel sheets of material;

FIG. 17 is an exploded view of a still further embodiment of the invention wherein two cushioning structures are sealed one to the other with the embossments of one structure meshing with the embossments of the other structure;

FIG. 18 is a plan view of the assembled product of FIG. 17;

FIG. 19 is a cross sectional view of FIG. 18 taken along the line 19—19 thereof;

FIG. 20 illustrates still another product in accordance with the invention wherein gas and moisture vapor barrier materials are combined with the cushioning product;

FIG. 21 illustrates an improved combination of the cushioning product with a resilient material on one side thereof;

FIG. 22 illustrates another improved combination of the cushioning material embedded within a resilient material; and FIG. 23 is a cross sectional view of still another product in accordance with the invention formed by sealing two molded films one to the other.

Broadly, the process in accordance with the invention contemplates in one aspect the fusion of plastic sheet materials one to the other to form a unitary resultant laminate, and in another aspect the fabrication of a laminated plastic product having a plurality of closely-spaced, discrete, sealed air pockets which affords a high degree of cushioning and shock absorbing action. It has been found that continuous sheets of plastic can be fused one to the other and form a good hermetic seal by heating at least the surfaces of the layers to a fusing temperature and then urging the heated surfaces into contact. This produces an immediate and permanent bond between the sheets being laminated and produces a homogeneous resultant product. This fusion sealing process is particularly useful for the fabrication of the improved cushioning material as it affords an hermetic seal about each air pocket which is important for good cushioning action. In fabricating the cushioning material, at least one of the films or layers is heated and then molded by means of a female cylinder or other suitable means to form a plurality of individual cells or pockets. As successive portions of the layer are molded, the surfaces of the layer surrounding the cells are retained at a fusing temperature and a second film heated to a similar temperature is applied to form a unitary structure, with each of the molded portions or cells individually sealed to form a plurality of discrete pockets or hollow elements containing air or other fluid permanently sealed therein. While other procedures may be utilized to adhere the films one to the other, it has been found that the use of the foregoing heat fusing affords the best results and produces more dependable and durable products. In actual practice it has been found that the method of molding and laminating plastics in accordance with the invention can be carried out at high speeds, speeds of the order of 150 to 400 feet per minute and even higher, depending on the thickness of the film and the dimension of the apparatus. By properly coordinating the temperature of the films with the speed of the apparatus, considerably higher speeds can be attained. While any suitable plastic film may be utilized for this purpose, excellent results have been attained with polyethylenes, polyolefins, polypropylenes, polyvinyl chlorides and its copolymer with polyvinyl acetate, polyvinylidene chloride, polyvinyl butyral and polystyrene as well as the thermosetting resins having a thermoplastic stage or being moldable before curing or vulcanizing like natural and synthetic rubbers and particularly butyl rubber.

Referring now to the drawings, and more specifically to FIG. 1, there is illustrated a molding roller 10 having a molded surface configuration for producing a plurality of discrete cells which may be of any desired shape or configuration and which preferably utilizes vacuum molding means. The term molding as used herein is intended to define a female roller as distinguished from a male or embossing roller. The product resulting from the molding operation, however, may properly be defined as embossed. More specifically, a first film 11 is fed on to the molding cylinder 10 by means of rollers 12, 13 and 14. These rollers are preferably heated at successively increasing temperatures in order to raise the temperature of the film 11 slowly and feed it on to the molding roller at a predetermined temperature. For instance, in the case of a low density polyethylene film the temperature of roller 12 may be maintained at approximately 180° to 200° F. while the rollers 13 and 14 would be maintained at about 230° to 240° F. It is to be understood, however, that these temperatures would necessarily vary depending on the nature of the thermoplastic, its softening and melting points as well as on the speed of the process and the thickness of the film, it being important that the surface layers of the films which are to be brought into contact one with the other are in the aforesaid fusing or tacky state.

With this improved process the surface portions of the embossed film are maintained at the fusing temperature of the particular plastic, for example 230° to 240° F. for low density polyethylene. One procedure for the attainment of this end involves the utilization of a heater 15, though a composite roller construction may be utilized wherein the salient portions of the molding roller include a surface layer of insulating material 10' to prevent cooling of the salient surfaces of the film while on the molding roller, which surfaces will form the bases of the molded cells. At the same time the remaining portions of the molded cells are reduced in temperature. A second film 16 is fed on to the molding roller by means of preheating rollers 17, 18 and 19. Here, again, the rollers are preferably maintained at successively increasing temperatures so that the film 16 when applied to the molding roller will have a surface temperature of the order of the fusing temperature of the material. When the surface layer of the film 16 contacts the salient surfaces of the molded film 11, fusing is effected immediately by contact of the two films while pressure is maintained through the cooperation of the roller 19 with the cylinder 10. Thus, a firm heat and pressure seal is effected and the composite cushioning material, as it travels about the remaining periphery of the cylinder 10 will cool to form a unitary structure and can be removed from the cylinder 10 by a stripping roller 20. The resultant cushioning material is denoted by the numeral 21 and may be transported to other equipment for further processing or may be packaged in rolls or other suitable means.

An additional factor affecting the fusing operation in accordance with the invention is the pressure of roller 19 against the molding roller 10. Under the temperature conditions outlined above for low density polyethylene film of the order of a few mils in thickness, pressures of the order of 30 to 60 lbs. per square inch are very satisfactory. The required pressure is essentially an inverse function of film temperature.

One embodiment of cushioning material that may be fabricated with the apparatus shown in FIG. 1 is illustrated in FIGS. 6, 7 and 10, while somewhat more detailed views of one form of the molding roller 10 is shown in FIGS. 8 and 9. Referring to the latter figures it will be observed that the roller 10 has inwardly formed recesses in the form of closely spaced hexagons and the heated plastic film is drawn into these openings by vacuum means including tubes 22 connected with a manifold 23.

FIG. 6 is an exploded view showing the molded film 11 and the second laminating film 16 prior to their lamination. FIG. 7 is a plan view showing the spacing of the hexagonal embossments 24, and it is evident that the use of such embossments affords an effective utilization of the area. FIG. 10 is a cross sectional view of the hexagonal elements shown in FIG. 7 and will be discussed in greater detail. Actual tests have indicated that a permanent hermetic seal of each of the elements 24 is readily attainable by this invention and thereby affords excellent cushioning and shock absorbing action.

Other procedures useful for the fabrication of a composite structure in accordance with the invention are illustrated in FIGS. 2 through 5. In FIG. 2 the heated molding roller is denoted by the numeral 10 and corresponds to the molding roller 10 of FIG. 1. The film to be molded is denoted in this figure by the numeral 25 and fed to the molding roller by means of a series of rollers 26, 27, 28 and 29 of which at least the rollers 27 through 29 are heated to gradually raise the temperature of the film to a molding temperature for the particular plastic involved. The roller 10 preferably includes a suitable vacuum means for effecting the molding and the temperature of the film surface is maintained at or near the fusing point until it arrives at the sealing roller 30. A second plastic film 31 is carried directly from the extrusion apparatus denoted by the numeral 32 about the sealing roller 30 and then urged into contact with the molded film 25. This film 31 may be at a temperature of as high as 500° F. when leaving the extrusion apparatus and roller 30 must be maintained at a low enough temperature so that the film 31 will be lowered to the desired fusing temperature at the time of application to film 25. The roller 30 further provides the required sealing pressure to force the film 31 into firm contact with the film 25. Since the film 31 is at a fusing temperature wherein at least the surface layers of the film are fluid, the engagement of the two films will cause them to firmly adhere one to the other and permanently seal the areas about molded portions of the film 25 to form a plurality of air pockets, as previously described. The film cools gradually as it travels with the roller 10 maintained by the vacuum under at least part of the atmospheric pressure and is removed from the roller 10 by a stripping roller 33. The resultant laminate 37 may then be transported from the molding roller by successive rollers 34, 35 and 36. The rollers 34 and 35 are preferably cooled in order to insure complete cooling of the laminated structure 37.

A still further modification of a method and apparatus for forming a laminated cushioning material in accordance with the invention is illustrated in FIG. 3. In this instance, as in the case of these forms of the invention shown in FIGS. 1 and 2, the molding roller is denoted by the numeral 10. A first extrusion means 40 extrudes a thin film 41 which passes about a roller 42 and is supported in its travel about that roller by a moving belt 43 carried by rollers 44, 45 and 46. One or more of the rollers 44 to 46 and belt 43 are preferably at a temperature that will lower the temperature of the extruded film to the fusing temperature just prior to lamination with the molded film denoted herein by the numeral 47. The film 47 is extruded by a suitable extruder 48 and is fed about the roller 49. The film is supported and protected in its transport about the roller 49 by a moving belt 50 carried by rollers 51, 52, and 53. These rollers together with the belt 50 are preferably at a temperature that will lower the temperature of the film to the molding temperature as previously described. The film 47 upon being fed on to the roller 10 will be molded and then laminated with film 41 to permanently seal the molded portions to form a plurality of closely spaced hermetically sealed pockets. As the composite film travels about the roller 10 it will cool and may be stripped from the molding roller by any suitable means as, for instance, the stripping roller 54. The film 35 may then be passed over suitable cooling rollers or subjected to other cooling means if the weight and thickness of the film requires it.

The apparatus diagrammatically illustrated in FIG. 4 corresponds in certain aspects to that shown in the previous figures. In this instance, however, double extruding means 60 are provided for the simultaneous extrusion of two films 61 and 62. The film 61 is fed about a roller 63 and is supported in its travel by a moving belt 64 carried by rollers 65, 66 and 67. The film 61 is then fed to the molding roller 10 and is there molded by vacuum or other suitable means. The film 62 is fed about the roller 62" and on to the molding roller and the roller 63 provides pressure contact between the film 61 and 62 to effect the heat fusing operation. The composite film 68 is then cooled during its travel about the roller 10 and is stripped therefrom by a stripping roller 69. Thereafter the film may be further cooled and processed as may be desired.

In certain instances it may be desirable to provide a cushioning material wherein both of the films to be laminated are molded and this end may be attained by the structure diagrammatically illustrated in FIG. 5. In this form of the invention a first film 70 is fed about a preheated roller 71 to a vacuum molding roller denoted by the numeral 72, though it is evident that any other suitable molding means may be employed. A second film 73 is fed about a roller 74 on to a vacuum molding belt 75 carried by rollers 76 and 77. The embossments on the belt 75 and the roller 72 are identical and are coordinated so that they overlie one another. The belt may be of any suitable construction that will provide vacuum means for effecting the molding of the film 73. Furthermore the film 70 and 73 may be preformed or they may be extruded directly into the apparatus as shown in FIGS. 3 and 4. In order to avoid unnecessary cooling of the outer surfaces of the molded films, it may be desirable to include appropriate heating means such as the electric heater 78 which will maintain at least the surface layers of the molded films in a slightly fluid or tacky condition to facilitate fusion. The fusion pressure is effected in this embodiment of the invention by maintaining the belt 75 in tension as it passes over the roller 72 and the pressure is controlled by a tension control roller denoted herein by the numeral 79. If desired, other tension or pressure means may be employed in order to effect this end, or a pair of cooperating molded rollers substantially identical to the roller 72 may be utilized to effect molding and also bring the two embossed films into pressure engagement. A product produced by this apparatus is illustrated generally in FIG. 23 and will be described along with the other cushioning structures illustrated generally in FIGS. 10 through 22. In certain instances it may be desirable to provide the sealed air pockets such as the pockets 16' as shown, for instance, in FIGS. 6 and 7 with air at a pressure at or slightly higher than atmosphere as measured after the product has been cooled. Inasmuch as the sealing of the fluid filled elements to produce the laminated cushioning structure may normally be carried out at atmospheric pressure and at a relatively high temperature, deflation of the pockets will result when the material is reduced to room temperature. Any suitable procedure may be used to correct or avoid this condition as, for instance, the performance of the sealing process in a higher pressure atmosphere so that upon cooling of the resultant product and its subjection to the normal atmospheric pressure, a selected pressure at or above atmospheric may be obtained within the pockets 16'. An alternative procedure to overcome deflation upon cooling involves reheating the cushioning material to slightly disemboss the material whereupon resultant contraction will produce somewhat smaller but fully inflated cells. Still other procedures including the use of the following fusion temperature tables sets forth the ranges of fusing temperatures for several classes of fusible plastics, it being understood that within each class of plastics there are numerous specific varying characteristics.

*Fusion Temperature Table*

| Class of material to be fused: | Fusion temperatures in degrees Fahrenheit |
|---|---|
| Polyvinyl chloride and the co-polymers | 325° to 350° |
| Polyethylenes (low and medium density) | 240° to 270° |
| Polyethylene (high density) | 270° to 320° |
| Polystyrenes | 250° to 275° |
| Styrene blends | 280° to 330° |
| Polypropylenes | 280° to 330° |

While it is preferable to effect the fusing of the two films one to the other by the fusing process as described wherein at least the meeting surfaces of the film are raised to a fusing temperature and then brought into contact under appropriate sealing pressure, other procedures may be used to form the cushioning and shock absorbing materials now to be described, provided, however, that good hermetic seals are produced.

The improved products in accordance with the invention are shown generally in FIGS. 6, 7 and 10 through 23. The form of the invention shown in FIGS. 6 and 7 involves the utilization of hexagonal sealed embossments 24 and in FIG. 10 it will be observed that each embossment 24 is provided with side walls 80 tapering so that the thinnest portion of the wall is farthest from the sealing film 16. The utilization of the tapered wall structure as indicated at 80 provides mechanical shock absorbing action and supplements the pneumatic action. For instance, the element 24 normally contains gas or other fluid sealed therein and when pressure is applied to compress this element, the walls will tend to expand and permit the element to be compressed. In many cases there is a point beyond which further compression cannot be withstood without rupturing the element 16'. In such an instance, the walls 80 will provide further support and, as the element itself is crushed the walls will afford increasing resistance until such time as the structure is completely destroyed. Thus, the structure of FIGS. 7 and 10 provides both pneumatic as well as mechanical shock absorbing action and such action is ideal when the material is employed to protect objects that may be dropped from high elevations and which require substantial shock absorbing action even though the shock absorbers are crushed during the impact. One instance would be in the dropping of items from aircraft or other similar vehicles in which case it is merely necessary to provide means to protect the article on impact.

The embossments 24 may be made of any desired shape or configuration with uniform or tapered walls and a modified structure is shown in FIGS. 11 and 12. In this case, the sealed elements, denoted by the numeral 82, are circular in configuration and will afford a somewhat modified cushioning action.

Another consideration in the fabrication of the cushioning material in accordance with the invention is the thickness of the films to be laminated. As the films are increased in thickness, additional shock resisting action will be provided. In certain cases it may be desirable to have embossed film of a fairly narrow gauge, as, for instance, films of the order of 1 to 5 thousandths of an inch, while the backing film may be relatively stiff to lend support for the structure. Thus, any number of variations may be made in the thickness of the sealed films and the size and configuration of the embossments to attain any desired shock absorbing action.

FIG. 13 illustrates still another embodiment of the invention wherein the sealed elements, denoted herein by the numeral 83, are in hemispherical form. A hemisphere has been found to provide a different type of shock absorbing action than the forms of the invention shown, for instance, in FIGS. 6 and 11, since the sphere can be compressed with a lighter force than that required to initiate compression on the previous forms of the invention, though the maximum resistance obtained from the hemispherical configuration is substantially the same as that obtained in the previous forms. With the hemisphere, however, the use of the tapered wall 84, while lending mechanical shock absorbing action, will not provide the degree of shock absorbing action that would be obtained, for instance, by the form of the invention shown in FIGS. 6 and 10.

In certain cases it may be desirable to utilize the cushioning material in accordance with the invention with other laminated materials. In the case of packaging, for instance, it may be desirable to apply a coated paper to one side of the structure, and this is illustrated in FIG. 14 wherein the paper, denoted by the numeral 85, is laminated to the sealing film 86. The sealing film is in turn laminated with an embossed film 87 as described in connection with FIGS. 1 through 5, inclusive.

When cushioning material is utilized for furniture, rug padding or other similar applications, it may be desirable to utilize a fabric backing 88 as illustrated in FIG. 15. In the case of paper and fabric laminates, as shown in FIGS. 14 and 15, the paper or fabric, as the case may be, is preferably first coated or laminated with the plastic layer 86 and then fused to the embossed layer 87 though other procedures may be used to attain the desired end. In the case of the paper and plastic laminate or the fabric and plastic laminate, such composite laminate may be substituted in place of the film 16 shown in FIG. 1 in the fabrication of the cushioning material.

FIG. 16 illustrates still another embodiment of the invention wherein an embossed film 89 is provided with a sealing layer 90 fused thereto to provide a plurality of sealed pockets 91 and a second layer 92 is sealed to the outer portions of the embossed film 89 to provide a cushioning material having two essentially coplanar surfaces. The film 92 in this form of the invention may be attached by heat sealing or by means of an appropriate adhesive, it being merely necessary to effect a good mechanical bond between the films 89 and 92, as a hermetic seal is unnecessary. With this structure it is possible to provide more uniform pressure distribution between the sealed elements 91 and, if desired, peripheral edges of the structure may be sealed in order to prevent the entrance of foreign matter, insects and the like. This is particularly important when utilized for furniture packaging material and other similar purposes.

FIGS. 17 through 19 illustrate still another embodiment of the invention wherein two laminated cushioning structures in accordance with the invention are combined to provide a single composite structure. It will be observed from FIG. 17 that two separate cushioning structures denoted by the numerals 93 and 94 are provided with the sealed embossments 93' and 94' in relatively widely spaced relationship. Each of the structures 93 and 94 correspond essentially to the structures shown in FIGS. 11 and 12 and may be of laminated plastic alone or combined with other materials as shown in FIGS. 14 and 15. The structures 93 and 94 are secured in overlying relationship with the sealed molded portions 93' and 94' being in meshing relationship so that the total thickness of the structure is not appreciably greater than the total thickness of either one of the structures. The combined structure is illustrated in FIG. 19 with the elements 93' shown in full line while the intermediate elements 94' are shown in dotted outline. The interleaving of these structures may be observed more clearly in FIG. 19 which shows the cells or elements in a contiguous relationship and thereby affords greater structural strength.

FIG. 20 illustrates still another form of the invention wherein the cushioning material is enclosed within a gas and moisture vapor barrier. In this form the cushioning material includes a suitably molded layer 95, a sealing layer 96, and overyling plastic layer 97, and upper and lower layers of aluminum foil or other similar material 98 and 99. The edges 100 are sealed about the entire periphery so that the cushioning means is completely protected.

In certain applications it is desirable to combine the resilient qualities of materials such as foam rubber with the cushioning qualities of the material embodying sealed air cells as previously described. For this purpose, a structure as shown for example in FIG. 21 may be employed wherein the cushioning structure such as shown in FIG. 7 for instance and denoted generally by the numeral 21 may be combined with a layer of foam rubber 101 cemented or otherwise adhered to one side thereof. While rubber and rubber-like materials can be fabricated with a variety of resilience, they cannot afford the advantages of cushioning structures in accordance with the invention. However, should a wide range of cushioning action be desirable, it has been found advantageous to combine a layer of foam rubber or synthetic foam rubber having a very soft cushioning characteristic, with a structure embodying a plurality of sealed elements in accordance with the invention. Thus the characteristics of the two cushioning means will afford a composite material that will provide a shock absorbing and cushioning action not heretofore attainable with known structures. It is also apparent that more dense resilient materials may be utilized, depending on the character and nature of the shock absorbing and cushioning actions desired.

FIG. 22 illustrates a further embodiment of the invention wherein the cushioning material such as the material 21 previously described, is completely enclosed within natural or synthetic rubber materials of any desired density. One layer 102 of the natural or synthetic rubber is adhered to one side of the structure 21 while a second layer 103 is adhered to the other side of the structure with the material 103 filling in the spaces between the sealed cushioning elements 16'. In this way the material 103 not only affords additional resiliency, but lends support for the cushioning elements 16'. This form of the invention is particularly useful for furniture padding, mattresses and the like and materially reduces the cost of the structure while affording more desirable cushioning action.

FIG. 23 illustrates still another modification of the invention involving the sealing of two embossed films in back-to-back relationship. In this form of the invention two embossed films 104 and 105 having a plurality of embossed elements 104' and 105' are heat sealed one to the other to form a plurality of sealed pockets. With this arrangement additional cushioning can be effected and by utilizing the tapered configuration of the embossed elements, as previously described, mechanical cushioning combined with a pneumatic cushioning can be effected.

The improved fusing technique in accordance with this invention wherein molded sheet material is heat sealed to a second layer of material by properly maintaining at least the meeting surfaces in a fusing or tacky form before pressing them together to form a substantially unitary resultant structure enables the introduction of other materials between the sealed layers for moisture vapor proofness, protection against fungi, bacteria, insects or rodents, fireproofing and other similar purposes. For instance, just prior to the heat sealing of the overlying embossed and sealing layers powdered calcium silicate or calcium stearate may be introduced to absorb moisture and water vapor and provide a completely dry atmosphere within the sealed elements. If desired, a suitable compound of boron and ammonium sulphate may be introduced between the layers immediately prior to the fusion for fireproofing purposes.

From the foregoing description it is evident that the cushioning materials in accordance with the invention may be made of a wide range of plastic materials and in any desired shape, size and configuration to meet the desired needs. The characteristics of the plastics utilized is also of importance since soft cushioning can be attained with highly plasticized thin films while firmer action results with the use of heavier films having reduced amounts of plasticizer.

This application constitutes a continuation-in-part of my prior application filed December 23, 1957, Serial No. 704,833, and entitled Laminated Material and Manufacture Thereof.

While only certain embodiments of the invention have been illustrated and described, it is understood that modification, alterations, and changes may be made without departing from the true scope and spirit thereof as defined by the appended claims.

What is claimed is:

1. The method for continuous fabrication of cushioning material comprising the steps of heating a plastic film having thermoplastic characteristics to an embossing temperature above the softening temperature but below the melting point thereof, feeding said heated film onto a female molding roller having discrete depressions distributed throughout the surface thereof with the peripheral edges of the depressions being spaced one from the others, forming said film into said depressions to produce embossments extending from one surface thereof, heating at least one surface of a second film having thermoplastic characteristics to a temperature in the vicinity of the melting point thereof, applying the heated surface of the second film to the first film on the molding roller while the exposed surface of said first film is at a temperature in the vicinity of its melting point to fuse the films one to the other and hermetically seal said embossments and then removing the fused films from said molding roller.

2. The method for continuous fabrication of cushioning material comprising the steps of heating a plastic film having thermoplastic characteristics to an embossing temperature above the softening temperature but below the melting point thereof, feeding said heated film onto a female vacuum molding roller having depressions formed in the surface thereof to produce discrete embossments in said film and extending from one surface thereof, applying suction to said vacuum roller, heating at least one surface of a second film having thermoplastic characteristics to a temperature in the vicinity of the melting point thereof, applying the heated surface of the second film to the first film on the molding roller while the exposed surface of said first film is at a temperature in the vicinity of its melting point to fuse the films one to the other and hermetically seal said embossments and then removing the fused films from said molding roller.

3. The method according to claim 1 including the step of extruding at least one of said plastic films and bringing it to a temperature above the softening point and slightly below its melting point immediately prior to its application to the molding roller.

4. The method according to claim 1 including the step of radiantly heating at least one film prior to the sealing of the two films.

5. The method for continuous fabrication of cushioning material comprising the steps of imparting heat to a first moving film with the heat intensity exceeding the melting point of said film, controlling the speed of said film to soften but not melt said film, feeding said heated film onto a female molding roller having discrete depressions formed in the surface thereof, forming said film into said depressions to produce embossments extending from the surface of the film in contact with the roller, imparting heat to a second moving film with the heat intensity exceeding the melting point of the last said film to heat at least one surface to its fusing temperature, applying said one surface of said second film to the exposed surface of the first said film while the latter is on said molding roller to fuse said films one to the other and hermetically seal said embossments to form a plurality of discrete cells, and then removing said fused films from the molding roller.

References Cited in the file of this patent

UNITED STATES PATENTS

| | | |
|---|---|---|
| 2,429,482 | Munters | Oct. 21, 1947 |
| 2,480,316 | Blair et al. | Aug. 30, 1949 |
| 2,503,164 | McGuire | Apr. 4, 1950 |
| 2,609,314 | Engel et al. | Sept. 2, 1952 |
| 2,627,297 | Faelten | Feb. 3, 1953 |
| 2,633,442 | Caldwell | Mar. 31, 1953 |
| 2,642,372 | Chittick | June 16, 1953 |
| 2,669,521 | Bierly | Feb. 16, 1954 |
| 2,670,501 | Michiels | Mar. 2, 1954 |
| 2,690,206 | Mueller | Sept. 28, 1954 |
| 2,759,866 | Seymour | Aug. 21, 1956 |
| 2,771,388 | Rocky et al. | Nov. 20, 1956 |
| 2,776,452 | Chavannes | Jan. 8, 1957 |
| 2,856,323 | Gordon | Oct. 14, 1958 |
| 2,858,247 | De Swart | Oct. 28, 1958 |
| 2,916,411 | Villoresi | Dec. 8, 1959 |
| 2,960,144 | Grof | Nov. 15, 1960 |
| 3,026,231 | Chavannes | Mar. 20, 1962 |
| 3,033,723 | Mead | May 8, 1962 |

FOREIGN PATENTS

| | | |
|---|---|---|
| 160,551 | Australia | Jan. 13, 1955 |